June 4, 1940.   E. P. STEVENSON ET AL   2,203,421
METHOD OF MOLDING CONTAINERS FROM PLASTIC MATERIALS
Filed April 27, 1937
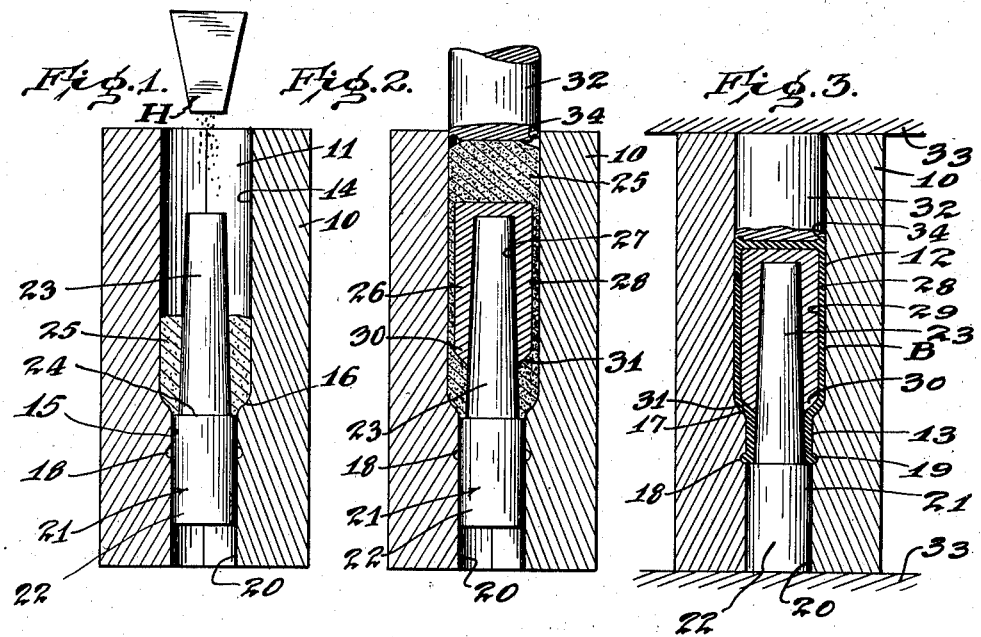
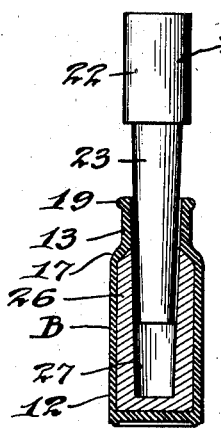
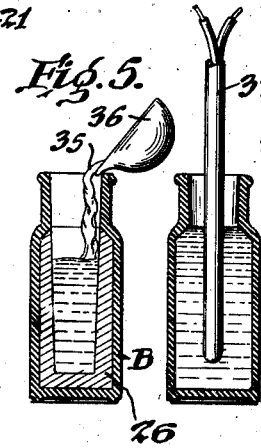
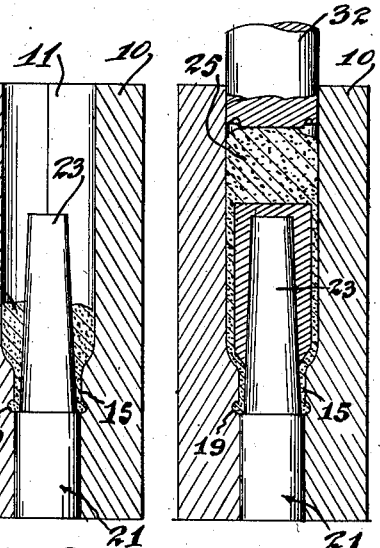
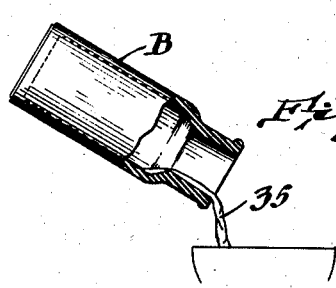
E. P. Stevenson AND
B. B. Fogler
INVENTORS
BY Rule & Hoge
ATTORNEYS Patented June 4, 1940

2,203,421

UNITED STATES PATENT OFFICE 2,203,421

METHOD OF MOLDING CONTAINERS FROM PLASTIC MATERIALS

Earl P. Stevenson, Newton, and Ben B. Fogler, Belmont, Mass., assignors to Arthur D. Little, Inc., a corporation of Massachusetts Application April 27, 1937, Serial No. 139,266

3 Claims. (Cl. 18—58)

The present invention relates to a method of forming articles from plastic materials wherein use is made of alloys melting at temperatures below that at which such materials are subject to decomposition. More specifically the invention relates to the manufacture from plastic substances such as urea-formaldehyde or phenol-formaldehyde condensation products, or other synthetic resins or resinoids, of hollow articles of relatively uniform wall thickness wherein a dimension of one or more transverse sections is greater than the diameter of the aperture. An example of such an article is a container or bottle having a neck opening smaller in diameter than the diameter of the body thereof. Articles manufactured in accordance with the principles of the present invention may be transparent, translucent or opaque. Containers so formed are found useful in the marketing or storing of hydrofluoric acid or other chemicals that cannot be stored in glass containers; in marketing or storing liquids or solids that are subject to deterioration when exposed to light; and in marketing liquid mercury or heavy solids for which glass containers are too fragile.

The principal object of the invention is to adapt the use of synthetic resins to the molding of articles for which the conventional methods are not applicable.

Other and important objects that require a more complete understanding of the nature of the invention for their full appreciation will become readily apparent as the description ensues and the advantages that accrue therefrom will be set forth in detail at the end of this description.

In the accompanying drawing one embodiment of the invention is illustrated. In this drawing:

Fig. 1 is a vertical sectional view taken centrally through a sectional mold manufactured in accordance with the principles of the invention, showing a forming mandrel mounted therein, and showing the mold partially filled with moldable material. This view illustrates the first step employed in carrying out the method of the invention;

Fig. 2 is a sectional view similar to Fig. 1, showing the completely filled mold prior to the forming operation;

Fig. 3 is a sectional view similar to Figs. 1 and 2, showing the mold after the forming operation;

Fig. 4 is a vertical sectional view taken centrally through the formed article, showing the forming mandrel partially removed therefrom;

Figs. 5 and 6 are sectional views similar to Fig. 4, illustrating the step of melting or liquefying a low temperature melting core within the formed article;

Fig. 7 is a side elevational view, partly in section, illustrating the manner in which the molten core is poured from the formed article; and Figs. 8 and 9 are sectional views similar to Figs. 1 and 2 respectively illustrating slightly modified steps that may be employed in carrying out the process of the present invention.

All of the above described views are more or less diagrammatic in their representation.

In carrying out the principles of the invention, there is provided a two-part, sectional, upright mold 10 having a central mold cavity 11 formed therein. The mold cavity 11 conforms in shape to the shape of the exterior side surface of the article to be formed which, in the present instance, is in the form of a bottle B (Figs. 3 to 7 inclusive). The body portion 12 of the bottle is formed in the upper region of the mold cavity 11 and the neck portion 13 thereof is formed in the lower region thereof and thus the bottle, when formed in the mold cavity 11, occupies an inverted position therein. Toward this end, the cylindrical wall of the mold cavity against which the body portion of the bottle is formed, is designated at 14 while the reduced cylindrical wall against which the neck portion of the bottle is formed is designated at 15. An inwardly and downwardly inclined annular portion 16 of the mold cavity wall connects the two cylindrical portions 12 and 13 thereof and serves to accommodate the forming of the tapered shoulder portion 17 of the bottle. An annular recess 18 extends around the extreme lower portion of the mold cavity 11 to accommodate the formation of a bead 19 at the upper end of the bottle neck 13.

The upper end of the mold cavity 11 is open and the lower end thereof communicates with an axial bore 20 which is in alignment therewith. The diameter of the axial bore 20 is equal to the diameter of the wall 15 and thus the bore 20 in effect forms an extension of the reduced portion of the mold cavity.

In carrying out the molding process, the sections of the mold 10 are heated in any suitable manner, for example, by steam, to a temperature suitable for curing the plastic material employed in the formation of the bottle. In the present instance a temperature of 325° F. has been found adequate when using a conventional type of phenolic-resin composition. A mandrel 21 having an enlarged base 22 and an elongated tapered portion 23 is inserted into the mold cavity 11 through the bore 20. The mandrel 21 is preferably formed of steel and is polished to a high degree. The enlarged base 22 of the mandrel 21 fits snugly within the bore 20 and the tapered portion 23 thereof extends centrally into the mold cavity in such a manner that the shoulder 24 existing between the base 22 and tapered portion 23 occupies a position just below the inclined annular wall 16 and closes off the neck portion 16 of the mold cavity from the body portion 14 thereof.

With the mandrel 21 in the position just described, approximately one-half, a small portion, of the comminuted or granulated resinous material 25 required to form the complete bottle is placed in the mold cavity 11 as shown in Fig. 1, a hopper H being provided for the purpose. The material may be packed about the tapered portion 23 of the mandrel 21 in any suitable manner as, for example, by jarring the mold or by the use of a suitable tamping tool, or by a combination of both these methods.

After the mold cavity 11 is partially filled with the comminuted material, a metal core 26 formed of a low melting point alloy is inserted in the mold cavity and is telescoped over the end of the tapered portion 23 of the mandrel 21 in the manner shown in Fig. 2.

The metal core 26 is provided with a tapered cavity 27 of such size and shape that a tight fit on the polished steel mandrel 21 is obtained. The outer configuration of the core 26 conforms to the shape of the interior of the bottle B exclusive of the neck portion thereof, and includes a cylindrical outer wall 28 against which the inner cylindrical wall 29 of the bottle B is formed and a tapered shoulder 30 against which the inner wall 31 of the tapered shoulder portion 17 is formed.

After the metal core 26 of low melting point is positioned on the mandrel, the remainder of the comminuted resinous material is placed in the mold cavity 11 and is packed in place about the core 26 by a jarring or tamping operation, or both. The mold is then transferred to a hydraulic press and a plunger 32 (Fig. 3) is caused to descend into the mold cavity 11 to compress the resinous material therein upon collapsing of the press platens 33. As the plunger 32 descends into the mold cavity 11, the entire mass contained within the mold cavity including the plunger 21 and metal core 26 is moved downwardly to the position shown in Fig. 3. During this downward movement of the contents of the mold cavity 11, the base 22 of the mandrel 21 is forced downwardly into engagement with the lower press platen 33, thus permitting a portion of the comminuted resinous material below the shoulder 30 of the core 26 to displace the base 22 of the mandrel 21 and flow into the space existing between the tapered portion 23 of the mandrel 21 and the reduced wall 15 of the cavity 11 and occupy both this space and the annular groove 18 in which the bead 19 is formed. The lower end of the plunger 32 is shaped to conform to the desired shape of the bottom of the bottle B which, in the present instance, is recessed as at 34. Because of the comparatively close fit between the polished mandrel 21 and the cavity 27 of the alloy core 26, the comminuted material is prevented from entering the cavity of the core 26.

The mold is allowed to remain between the platens of the hydraulic press for a predetermined period of time during which the resinous material 25 becomes cured. As previously stated, the mold 11 is preheated to the desired temperature prior to introduction of the resinous material to the cavity thereof. The temperature of the mold is maintained at the desired degree while the mold is in the hydraulic press, and toward this end the platens 33 thereof may be heated by steam or otherwise.

At the termination of the curing period, the mold 10 is opened and the entire contents thereof including the mandrel 21, alloy core 26, and the molded bottle B are removed therefrom. The mandrel 21 is then stripped from the cavity 27 in the metal core 26 as shown in Fig. 4, this operation requiring but little effort on account of the tapering fit between these two parts.

Subsequently the bottle is turned upright and the cavity 27 existing in the metal core 26 is filled with molten metal of the same composition and preferably at a temperature well above the melting point of the metal. Fig. 5 illustrates this step in the process and shows molten metal 35 being poured from a receptacle 36 into the core cavity 27.

In order to completely melt the metal of the core 26, a heating element 37 (Fig. 6) is inserted into the filled cavity 27 and, when the metal has been completely liquefied, it is decanted as shown in Fig. 7 and reclaimed for use again.

In Figs. 8 and 9, a slightly different initial procedure in forming the bottle is illustrated. The method involved and illustrated in these two views is particularly well adapted for use in forming bottles, the neck walls of which are comparatively thin. The initial charge is introduced into the mold cavity 11 and compacted therein with the mandrel 21 in its lowermost position as illustrated in Fig. 8. Thus a portion of the material enters the narrow cylindrical space between the tapered portion 23 of the mandrel 21 and the reduced neck portion 15 prior to insertion of the alloy core 26 on the mandrel. As shown in Fig. 9, the core 26 is then placed on the mandrel and the remainder of the charge is introduced into the mold cavity 13 and compacted therein in the manner previously described. The mold is then transferred to the hydraulic press and the plunger 32 thereof is caused to descend into the mold cavity to compress the comminuted material therein. It will be seen, therefore, that because the comminuted material is distributed above the alloy core 26 and below the shoulder 30 thereof in substantially the correct proportion, the molding pressure is used mainly in compacting the material where it has already been placed rather than in effecting a flow of the material into the relatively thin cylindrical space between the mandrel and neck portion 15 of the mold cavity.

The advantages that are inherent in the above described processes are manifold. The use of a tapered mandrel 21 of highly polished steel offers a rigid support for the central core 26. Furthermore, due to the tapering fit between the mandrel and core and due to the polished surface of the former, stripping of the mandrel from the core is greatly facilitated. Finally, the cavity 27 provided in the alloy core of low melting point not only materially reduces the amount of metal required to be melted from the bottle, but in addition provides a space into which a relatively large quantity of hot molten metal may be poured to cause rapid reduction of the metal to its molten state.

When using the process above described for the molding of articles from phenolic resins, an alloy of the following composition will be found suitable: bismuth 1 part, lead 4 parts, tin 5 parts, which has a melting point of 162° C. (324° F.). As is well known, alloys of this type can be closely adjusted as to melting point by controlling the proportions of the constituents. (See Circular of the Bureau of Standards, No. 388, "Use of Bismuth in Fusible Alloys.")

Modifications may be resorted to within the sphere and scope of the appended claims. For instance, use may be made of fusible alloy cores as an element for an injection mold as well as for molds of the compression type, as illustrated in the Figs. 1 through 3. It will be found desirable to use this method for the more complicated moldings with thin walls in accordance with the recognized advantages for injection molding. Also use may be made of these alloys while in a molten state as well as in the form of a solidified core. Such a modification would be applicable to the molding, for example, of tubes as in the following procedure: Mandrels wound with paper containing synthetic resin can be mounted in the header of a retort which, when filled with a molten alloy under suitable pressure, would constitute a mold. After subjecting the tubes to the molding action of the molten metal under pressure for a prescribed time, the pressure is released, the header removed, and the tubes withdrawn from the supporting mandrels. Such use of molten metal would permit of the multiple molding of such articles as tubes, which has heretofore not been accomplished. In such practice it would be found desirable to use an alloy melting at a lower temperature than that given in the example of compression molding. When so working with phenolic resins, an alloy melting around 125° C. (254° F.) will be found suitable. Such an alloy is made up of equal parts of bismuth, lead, and tin.

We claim:

1. The method of forming a container having a body portion and a reduced neck portion which consists in preheating a mold having a cavity the walls of which conform in configuration to the shape of the side walls of the container, centering a tapered mandrel in said cavity, partially filling said cavity with resinous moldable material below the level of the top of said mandrel, telescoping a hollow core having an exterior configuration conforming to the shape of the inner walls of the body portion of the container over the upper end of said mandrel, adding additional moldable material to said cavity to bring the level thereof above said core, compressing said material in said cavity and allowing the same to become set, removing the formed container from the mold, withdrawing said mandrel from said hollow core, and removing the core from the formed container.

2. The method of forming a container having a body portion and a reduced neck portion which consists in preheating a mold having a cavity, the walls of which conform in configuration to the shape of the side walls of the container, centering a tapered mandrel in the enlarged body portion of said cavity, partially filling the enlarged body portion of said cavity with moldable material and excluding said material from the reduced neck portion of the cavity, telescoping a hollow core having an exterior configuration conforming to the shape of the inner walls of the body portion of the container over the upper end of said mandrel, adding additional moldable material to said cavity to bring the level thereof above said core, compressing said material in said enlarged body portion of the cavity and causing a portion thereof to flow into the reduced neck portion thereof, allowing said material to become set, removing the formed container from the mold, withdrawing said mandrel from said hollow core, and removing the core from the formed container.

3. The method of forming bottles having tapered shoulders from granular moldable materials which consists in preheating a mold having a cavity the walls of which conform in configuration to the shape of the side walls of both the body and neck portion of the bottle, centering a tapered mandrel having an enlargement in the body portion of the cavity, partially filling the body portion of the cavity with granular moldable material while excluding the material from the neck portion of the cavity by means of the enlargement on the mandrel, telescoping a hollow core having an exterior configuration conforming to the shape of the inner walls of the body portion of the container but exclusive of the inner walls of the neck portion thereof over the upper end of said mandrel, adding additional material to said cavity to bring the level thereof above the core, compressing said material in the enlarged body portion of the cavity and causing a portion thereof to flow into the neck portion thereof, allowing the material to become converted, removing the formed container from the mold, withdrawing the mandrel from the core, and removing the core from the formed container.

EARL P. STEVENSON.
BEN B. FOGLER.